United States Patent [19]

Fujisawa et al.

[11] Patent Number: 5,675,240

[45] Date of Patent: Oct. 7, 1997

[54] ALL DIGITAL SWITCHING REGULATOR FOR USE IN POWER SUPPLIES, BATTERY CHARGERS, AND DC MOTOR CONTROL CIRCUITS

[75] Inventors: Yukio Fujisawa; Isao Takinoue, both of Hyogo, Japan

[73] Assignees: Mitsubishi Electric Semiconductor Software Corporation, Itami; Mitsubishi Denki Kabushiki Kaisha, Tokyo, both of Japan

[21] Appl. No.: 495,391

[22] Filed: Jun. 28, 1995

[30] Foreign Application Priority Data

Oct. 5, 1994 [JP] Japan ................................. 6-241292

[51] Int. Cl.⁶ .......................................................... G05F 1/40
[52] U.S. Cl. ................................... 323/282; 323/283
[58] Field of Search ........................................ 323/282, 283, 323/284, 288, 351

[56] References Cited

U.S. PATENT DOCUMENTS

| | | | |
|---|---|---|---|
| 4,455,526 | 6/1984 | Miller | 323/282 |
| 4,518,867 | 5/1985 | Lamboley | 307/252 B |
| 4,975,820 | 12/1990 | Szepesi | 363/21 |
| 5,057,765 | 10/1991 | Clark et al. | 323/288 |
| 5,399,958 | 3/1995 | Iyoda | 323/282 |
| 5,528,125 | 6/1996 | Marshall et al. | 323/222 |
| 5,565,761 | 10/1996 | Hwang | 323/222 |

OTHER PUBLICATIONS

Transistor Technique, Jan. 1994, pp. 299–312, "Switching Regulator IC for Onboard".

*Primary Examiner*—Adolf Berhane
*Attorney, Agent, or Firm*—Oblon, Spivak, McClelland, Maier & Neustadt, P.C.

[57] ABSTRACT

A switching regulator is composed of digital circuits only. A switching regulator (30) comprises a driver (2) for directly controlling the operation of a switching transistor (1), and an OR gate (6) for determining the logic issued by the driver (2). An output terminal (Q) of an RS flip-flop (5) is connected to one input end of the OR gate (6), the output of a timer (40c) is applied to a set terminal (S) of the RS flip-flop (5), and the output of a comparator (4) is applied to a reset terminal (R1) through an OR gate (7). At a non-reverse input end of the comparator (4), a reference voltage (VE) is applied by a D/A convertor (40b), while a feedback voltage (VFB) is applied to a reverse input end. Accordingly, chopping of the switching transistor (1) is done on the basis of a rectangular pulse.

18 Claims, 10 Drawing Sheets

ALL DIGITAL SWITCHING REGULATOR FOR USE IN POWER SUPPLIES, BATTERY CHARGERS, AND DC MOTOR CONTROL CIRCUITS

BACKGROUND OF THE INVENTION

1. Field of the Invention

The present invention relates to a switching regulator, a power source circuit, a battery charger, and a motor control circuit, and more particularly to a technology for digital controlling of switching.

2. Description of the Background Art

A system using a microcomputer always requires a stabilized DC power source. As such DC power source, a switching power source of the type of using a switching regulator IC for control and a transistor for driver is coming in the main stream.

Figure 8:
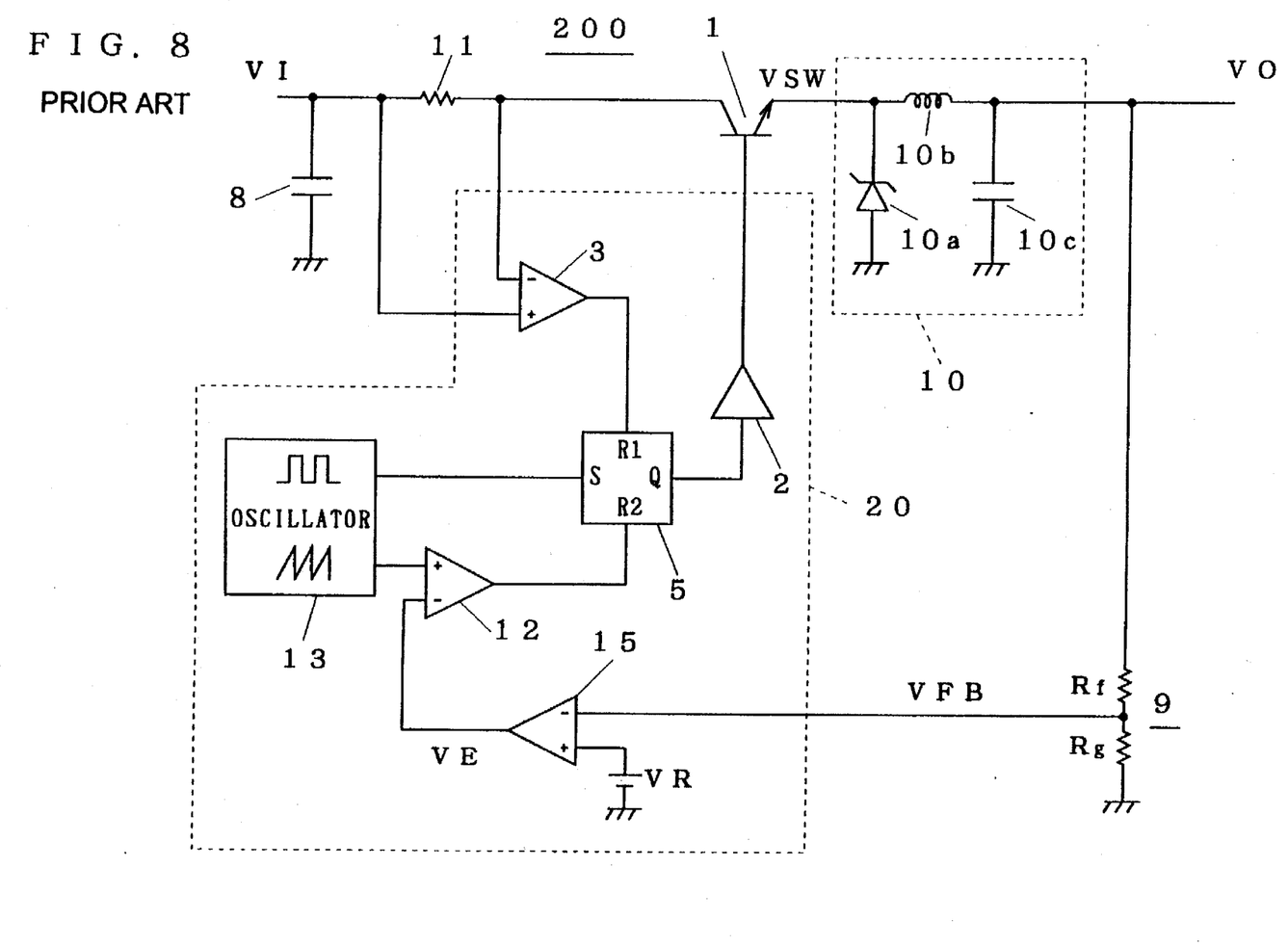
FIG. 8 is a circuit diagram showing a background art.

FIG. 8 is a circuit diagram showing the construction of a conventional stabilized DC power source 200. The stabilized DC power source 200 comprises a switching transistor 1, a switching regulator 20, a stabilizing capacitor 8, a current detecting resistor 11, a smoothing circuit 10, and a voltage setting circuit 9. The switching regulator 20 controls the operation of the switching transistor 1, and the current detecting resistor 11 detects the current flowing in the switching transistor 1. The stabilizing capacitor 8 stabilizes the input voltage VI.

The switching transistor 1 chops the input voltage VI and converts into a switching voltage VSW. The smoothing circuit 10 smoothes the switching voltage VSW as effective value, and produces an output voltage VO.

The voltage setting circuit 9 is composed of series connection of resistances Rf, Rg, and divides the output voltage VO, and applies a feedback voltage VFB to the switching regulator 20. A voltage drop occurring in the current detecting resistor 11 is also applied to the switching regulator 20.

The switching regulator 20 comprises a driver 2, comparators 3, 12, an RS flip-flop 5, an oscillator 13, and an error amplifier 15.

The operation of the switching transistor 1 is controlled by the logic (Q output) given to an output terminal Q of the RS flip-flop 5 through the driver 2. At a set terminal S of the RS flip-flop 5, a rectangular pulse wave is given from the oscillator 13. The output of the comparator 3 is given to a first reset terminal R1, and the output of the comparator 12 is given to a second reset terminal R2.

The comparator 3 receives a voltage drop occurring in the current detecting resistor 11, and resets the RS flip-flop 5 if an excessive current flows in the switching transistor 1, and stops the operation of the switching transistor 1 through the driver 2.

The error amplifier 15 is provided with a reference voltage VR and feedback voltage VFB, and the higher the feedback voltage VFB, the smaller becomes an output potential VE of the error amplifier 15. For example, the reference voltage VR is set at 2.21 V.

At a non-reverse input end of the comparator 12, sawtooth waves are given from the oscillator 13, and at a reverse input end, the output potential VE is applied. Only when the output of the error amplifier 15 is lower than the sawtooth waves, the RS flip-flop 5 is reset, and the operation of the switching transistor 1 is stopped through the driver 2.

Figure 9:
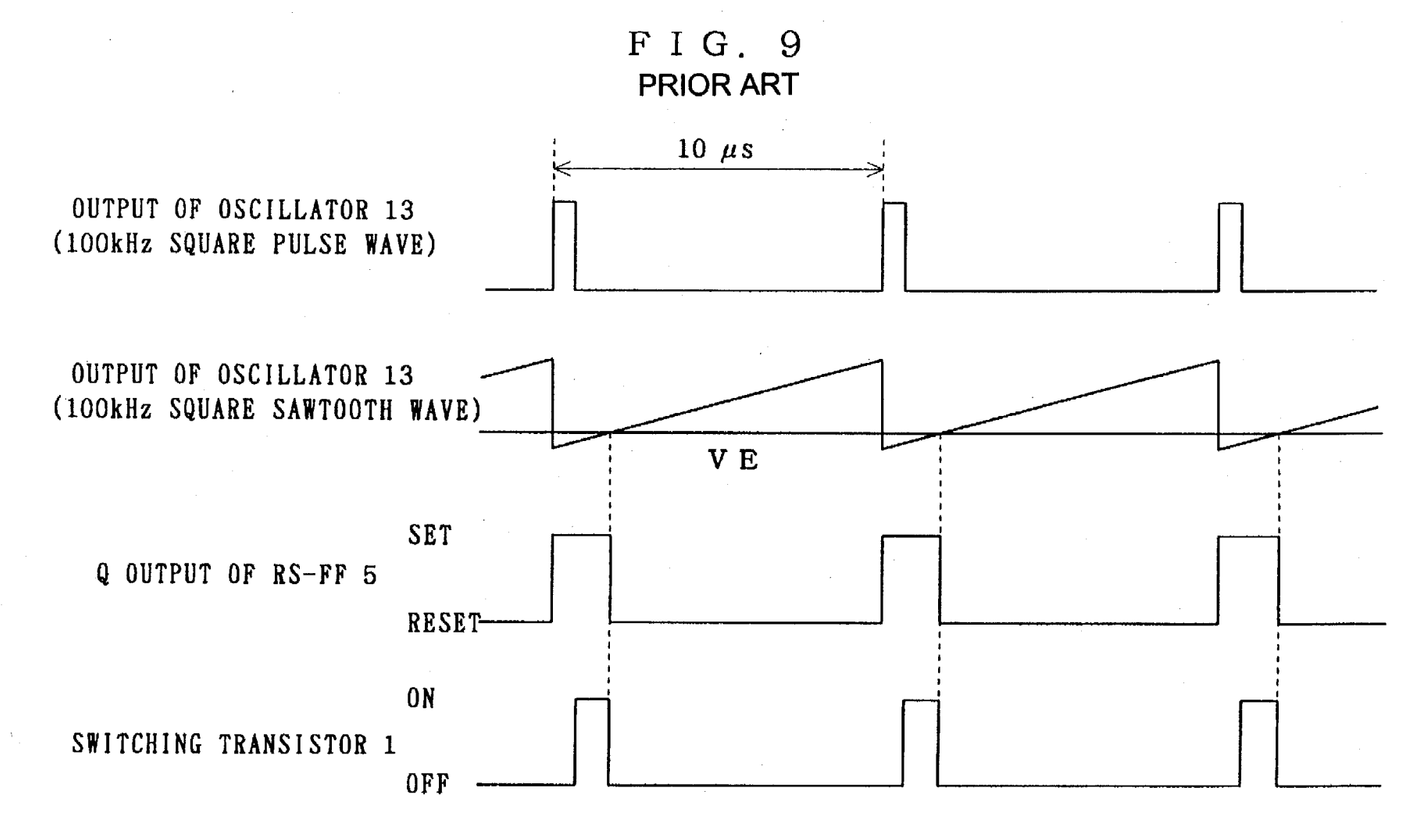
FIGS. 9 and 10 are waveform diagrams for explaining the operation of the background art.
Figure 10:
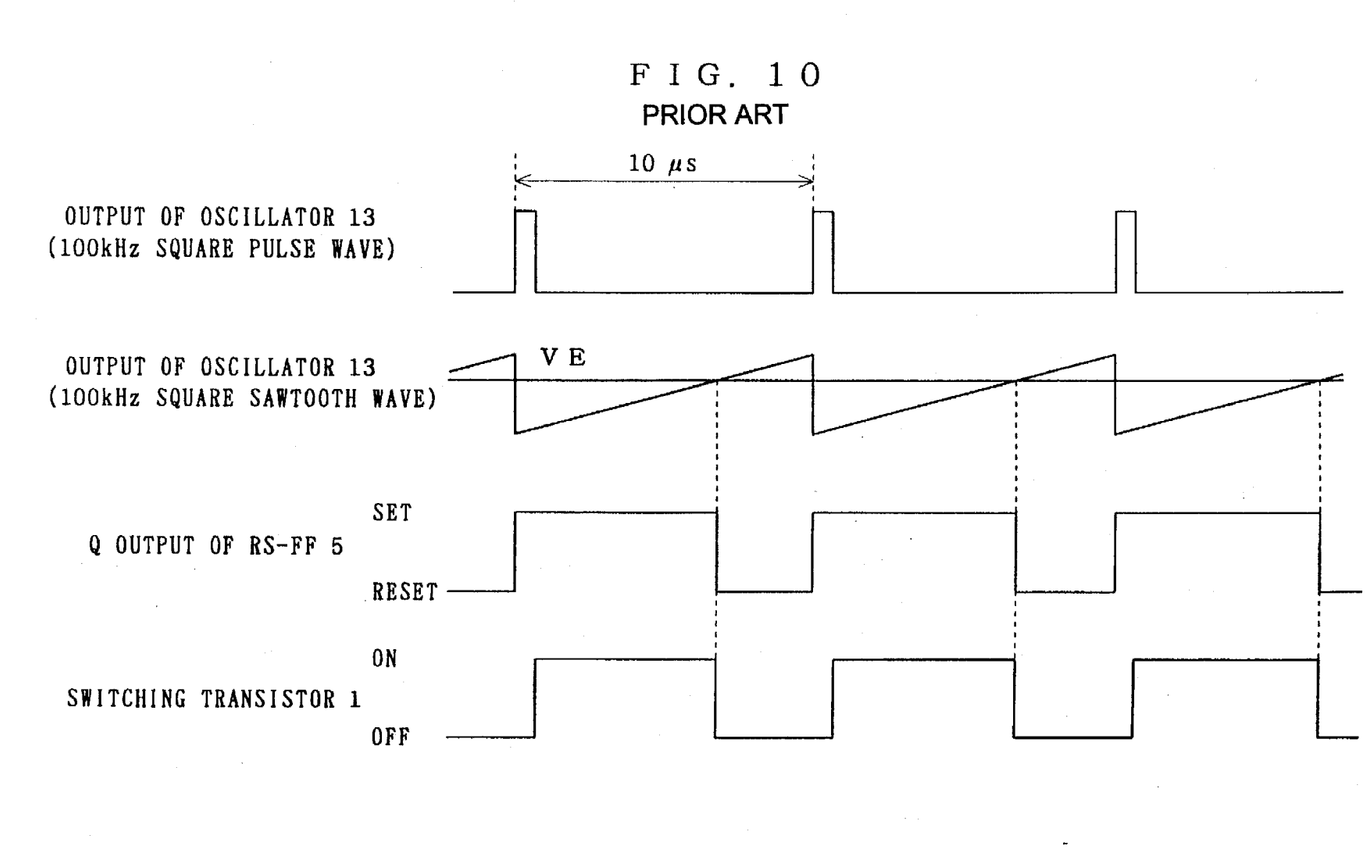

FIG. 9 is a waveform diagram showing the operation of the stabilized DC power source 200 in the case of elevation of feedback voltage VFB by the rise of the output voltage VO, and FIG. 10 is a waveform diagram showing the operation of the DC stabilized power source in the case of drop of feedback voltage VFB by the fall of the output voltage VO.

In either case, the rectangular pulse wave and sawtooth wave of the oscillator 13 are equal in the frequency, and set, for example, at 100 kHz. The both waves rise simultaneously. By the rise of the rectangular pulse wave, the logic of the output terminal Q of the RS flip-flop 5 is started up. That is, the RS flip-flop 5 is set. If, however, the potential of the sawtooth wave exceeds the output potential VE, the Q output of the RS flip-flop 5 is lowered by the comparator 12. That is, the RS flip-flop 5 is reset.

In the case shown in FIG. 9, the feedback voltage VFB rises and the output potential VE of the error amplifier 15 declines, and therefore the period in which the sawtooth wave is below the output potential VE is short. Therefore, the set (being "H") period of the Q output of the RS flip-flop 5 is short, and the ON period of the switching transistor 1 is also short.

In the case shown in FIG. 10, to the contrary, the output potential VE of the error amplifier 15 climbs up, and the period in which the sawtooth wave is below it is long. Therefore, the set period of the RS flip-flop 5 is long, and the ON period of the switching transistor 1 is also long.

The output voltage VO elevates higher as the ON period of the switching transistor 1 is longer, and therefore the switching regulator 20 applies a negative feedback to the output voltage VO, so that the output voltage VO may be stabilized.

Considering, however, to incorporate the function of the switching regulator 20 as a peripheral device of a microcomputer, problems occur in the noise characteristic. That is, since the switching regulator 20 is mainly composed of analog circuits such as oscillator 13 and error amplifier 15, if incorporated in a microcomputer, switching noise of the bus of the microcomputer occurs every time the microcomputer operates, and noise is induced into the feedback voltage VFB which is the input of the error amplifier 15, the output potential VE which is its output, the sawtooth wave, and others, and normal operation is disturbed. Besides, the analog circuit itself may have a electrostatic capacity.

As the measure against such noise, it may be attempted to isolate the analog signals from the digital circuit by forming a guard ring with a lead wire for mounting static signals such as grounding cable. As a result, the chip of the microcomputer requires a space for the circuit used for isolation, as well as the circuits of the switching regulator 20, and the size becomes very large and it is not practicable.

SUMMARY OF THE INVENTION

A first aspect of the present invention is directed to a switching regulator which comprises: (a) a first logic circuit possessing: (a-1) a set end to be provided with a frequency variable rectangular pulse transiting between complementary first and second logic values, (a-2) a reset end, and (a-3) an output end for issuing the first logic value when the first logic value is given to the set end, and the second logic value when the first logic value is given to the reset end; and (b) a second logic circuit possessing: (b-1) a first input end to be provided with a fixed value, (b-2) a second input end to be provided with a value to be measured, and (b-3) an output end connected to the reset end of the first logic circuit, for issuing the first logic value when a value given to the second input end is greater than a value given to the first input end, and the second logic value when the value given to the second input end is smaller than the value given to the first input end.

In the switching regulator of the first aspect of the invention, by controlling the switching element which controls the current supply on the basis of the logic value given to the output end of the first logic circuit, feedback can be applied to the operation of the switching element, with the voltage generated on the basis of the current supplied by the switching element as the measured value. What is more, analog circuit is not needed.

Furthermore, when using the LC circuit for smoothing the current supplied by the switching element, the resonance frequency of this LC circuit may be varied from the frequency of the rectangular pulse.

Therefore, in the switching regulator according to the first aspect of the invention, the switching regulator can be composed only of digital circuits, and it operates without being affected by noise if incorporated in a microcomputer. Still more, when using an LC circuit for smoothing the current supplied by the switching element, resonance of chopping between this LC circuit and switching element can be avoided.

Preferably, according to a second aspect to the invention, a switching regulator of the first aspect of the invention further comprises: (c) a third logic circuit possessing a first input end connected to the output end of the first logic circuit, a second input end to be provided with the rectangular pulse, and an output end for issuing an OR of logic values given to the first and second input ends thereof.

In the switching regulator of the second aspect of the invention, if the first logic circuit does not issue the first logic value, the third logic circuit periodically issues the first logic value.

Therefore, in the switching regulator according to the second aspect of the invention, by controlling the switching element which controls the current supply, on the basis of the logic value given to the output end of the third logic circuit, the current can be supplied even if the measured value is larger than the fixed value.

Preferably, a third aspect of the invention relates to a switching regulator of the second aspect of the invention, wherein the switching regulator is connected to a microcomputer; and the rectangular pulse is supplied from the microcomputer.

In the switching regulator in the third aspect of the invention, rectangular pulses are supplied from the microcomputer. Since a timer is generally built in the microcomputer, means for generating rectangular pulses is not particularly needed by incorporating the switching regulator into the microcomputer.

Therefore, in the switching regulator in the third aspect of the invention, since it is not necessary to install particular means for generating rectangular pulses, the switching regulator can be incorporated into the microcomputer without extremely lowering the degree of integration.

Preferably, according to a fourth aspect of the invention, a switching regulator of the third aspect of the invention further comprises: (d) a fourth logic circuit possessing: (d-1) a first input end connected to the output end of the second logic circuit, (d-2) a second input end, and (d-3) an output end connected to the reset end of the first logic circuit, for issuing an OR of the logic values given to the first and second input ends thereof; wherein the microcomputer receives a logic value given to the second input end of the fourth logic circuit, and supplies the rectangular pulse having a different frequency corresponding to the logic value.

In the switching regulator in the fourth aspect of the invention, by giving a reset signal to the second input end of the third logic circuit, if the second logic circuit does not issue the first logic value, the first logic circuit can be reset. Moreover, the frequency of rectangular pulse may be different depending on whether or not to reset the first logic circuit.

In the switching regulator in the fourth aspect of the invention, hence, in the event of an accident to avoid, such as flow of excessive current, it is possible to lower the frequency of the operation of the switching element that is controlled on the basis of the logic value given to the output end of the first logic circuit. Still more, this frequency can be easily changed by programming of the microcomputer.

A fifth aspect of the invention is related to a power source circuit which comprises: (a) an output terminal, and an input terminal to which an input voltage is supplied; (b) a switching element possessing a first end connected to the input terminal, a second end connected to the output terminal, and a control end, the switching element being controlled whether or not to connect the first end and the second end on the basis of a value given to the control end; (c) a first logic circuit possessing: (c-1) a set end to be provided with a frequency variable rectangular pulse transiting between complementary first and second logic values, (c-2) a reset end, and (c-3) an output end connected to the control end of the switching element, for issuing the first logic value when the first logic value is given to the set end, and the second logic value when the first logic value is given to the reset end; (d) a second logic circuit possessing: (d-1) a first input end to be provided with a fixed value, (d-2) a second input end to be provided with a measured value obtained on the basis of a voltage applied to the output terminal, and (d-3) an output end connected to the reset end of the first logic circuit, for issuing the first logic value when a value given to the second input end is greater than a value given to the first input end, and the second logic value when the value given to the second input end is smaller than the value given to the first input end; (e) a smoothing circuit provided between the second end of the switching element and the output terminal; and (f) a resonance detecting circuit for detecting whether the smoothing circuit is resonating to the rectangular pulse or not.

In the power source circuit in the fifth aspect of the invention, feedback can be applied to the operation of the switching element, using the voltage generated on the basis of the current supplied by the switching element as the measured value. Still more, analog circuit is not needed. In addition, the frequency of rectangular pulse is variable, so that the resonance frequency of the smoothing circuit and the frequency of rectangular pulse may be different.

Therefore, in the power source circuit in the fifth aspect of the invention, the first and second logic circuits can be composed of digital circuits only, and when they are incorporated in the microcomputer, they operate without being affected by noise. Moreover, resonance between the smoothing circuit and chopping of switching element can be avoided.

Preferably, according to a sixth aspect of the invention, a power source circuit of the fifth aspect of the invention further comprises: (g) a microcomputer possessing: (g-1) a timer for issuing the rectangular pulse, (g-2) a CPU for controlling the operation of the timer, and (g-3) a data bus for mutually connecting the timer and the CPU.

Accordingly, the resonance detecting circuit transmits a state of resonance of the smoothing circuit with the rectangular pulse to the CPU through the data bus.

In the power source circuit in the sixth aspect of the invention, the frequency of the rectangular pulse is varied when the smoothing circuit is resonating with the rectangular pulse in the CPU, in the microcomputer.

Also in the power source circuit in the sixth aspect of the invention, resonance between the smoothing circuit and chopping of switching element can be avoided.

Preferably, a seventh aspect of the invention relates to a power source circuit of the sixth aspect of the invention, wherein the microcomputer further possesses: (g-4) a D/A convertor connected to the data bus for issuing the fixed value, being controlled by the CPU.

In the power source circuit in the seventh aspect of the invention, the fixed value can be changed by the control of the CPU in the microcomputer.

The power source circuit in the seventh aspect of the invention can easily change the value of the voltage to be applied to the output terminal.

Preferably, according to an eighth aspect of the invention, a power source circuit of the sixth aspect of the invention further comprises: (h) a third logic circuit possessing a first input end connected to the output end of the first logic circuit, a second input end to be provided with the rectangular pulse, and an output end for issuing an OR of logic values given to the first and second input ends thereof.

In the power source circuit in the eighth aspect of the invention, if the first logic circuit does not issue the first logic value, the third logic circuit periodically issues the first logic value.

Therefore, in the power source circuit in the eighth aspect of the invention, since the switching element is controlled on the basis of the logic value given to the output end of the third logic circuit, current can be supplied even if the measured value is greater than the fixed value.

Preferably, according to a ninth aspect of the invention, a power source circuit of the eighth aspect of the invention further comprises: (i) a fourth logic circuit for issuing the first logic value when a current flowing in the switching element exceeds a specified value; and (j) a fifth logic circuit possessing: (j-1) a first input end connected to the output end of the second logic circuit, (j-2) a second input end for receiving the output of the fourth logic circuit, and (j-3) an output end connected to the reset end of the first logic circuit, for issuing an OR of logic values given to the first and second input ends thereof; wherein an output of the fourth logic circuit is applied to the CPU through the data bus; and the CPU has the timer for generating the rectangular pulse having a different frequency, depending on whether the output of the fourth logic circuit is the first or second logic value.

In the power source circuit in the ninth aspect of the invention, when the current flowing in the switching element exceeds a specified value, the first logic circuit can be reset if the second logic circuit does not issue the first logic value.

In the power source circuit in the ninth aspect of the invention, if an excessive current flows in the switching element, the switching element can be operated at low frequency. This frequency can be easily changed by programming of the microcomputer.

A tenth aspect of the invention is directed to a battery charger control circuit which comprises: (a) an input terminal to which an input voltage is supplied, and an output terminal for supplying a charging current to a battery; (b) a switching element possessing a first end connected to the input terminal, a second end connected to the output terminal, and a control end, the switching element being controlled whether or not to connect the first end and the second end on the basis of a value given to the control end; (c) current-voltage converting means for converting the charging current into a voltage; (d) measured value generating means for generating a measured value on the basis of a voltage applied to the battery; (e) reference signal generating means for giving a reference value to be compared with the measured value; and (f) a microcomputer possessing: (f-1) a timer for giving a frequency variable rectangular pulse transiting between complementary first and second logic values, (f-2) a first logic circuit possessing: (f-2-1) a set end to be provided with the rectangular pulse, (f-2-2) a reset end, and (f-2-3) an output end connected to the control end of the switching element, for issuing the first logic value when the first logic value is given to the set end, and the second logic value when the first logic value is given to the reset end, (f-3) a second logic circuit possessing: (f-3-1) a first input end to be provided with a fixed value, (f-3-2) a second input end to be provided with an output of the current-voltage converting means, and (f-3-3) an output end for issuing the first logic value when a value given to the second input end thereof is greater than a value given to the first input end thereof, and the second logic value when a value given to the second input end thereof is smaller than the value to the first input end thereof, (f-4) a third logic circuit possessing: (f-4-1) a first input end to be provided with the reference value, (f-4-2) a second input end to be provided with the measured value, and (f-4-3) an output end for issuing the first logic value only when a specified potential difference is caused between the first and second input ends thereof, (f-5) a fourth logic circuit possessing: (f-5-1) a first input end connected to the output end of the second logic circuit, (f-5-2) a second input end connected to the output end of the third logic circuit, and (f-5-3) an output end connected to the reset end of the first logic circuit, for issuing an OR of a logic value given to the first input end thereof and a logic value given to the second input end thereof, (f-6) a CPU for controlling an operation of the timer, and (f-7) a data bus for mutually connecting the timer and the CPU.

In the battery charger control circuit in the tenth aspect of the invention, charging current of the battery is controlled by chopping according to the rectangular pulse given by the microcomputer. This chopping control is done same as in the switching regulator of the first aspect of the invention.

Therefore, in the battery charger control circuit in the tenth aspect of the invention, since chopping control is digital, the noise characteristic does not deteriorate if this controlling section is incorporated into the microcomputer.

An eleventh aspect of the invention is related to a DC motor control circuit which comprises: (a) an input terminal to which an input voltage is supplied, and an output terminal for supplying a driving current to a DC motor; (b) a switching element possessing a first end connected to the input terminal, a second end connected to the output terminal, and a control end, the switching element being controlled whether or not to connect the first end and the second end on the basis of a value given to the control end; (c) current-voltage converting means for converting the driving current into a voltage; (d) a microcomputer possessing: (d-1) a timer for giving a frequency variable rectangular pulse transiting between complementary first and second logic values, (d-2) a first logic circuit possessing: (d-2-1) a set end to be provided with the rectangular pulse, (d-2-2) a reset end, and (d-2-3) an output end connected to the control end of the switching element, for issuing the first logic value when the first logic value is given to the set end, and the second logic value when the first logic value is given to the reset end, (d-3) a second logic circuit possessing: (d-3-1) a first input end to be provided with a fixed value, (d-3-2) a second input end to be provided with an output of the current-voltage converting means, and (d-3-3) an output end connected to the reset end of the first logic circuit, for issuing the first logic value when a value given to the second input end thereof is greater than a value given to the first input end thereof, and the second logic value when the value given to the second input end thereof is smaller than the value to the first input end thereof, (d-4) a CPU for controlling the operation of the timer, and (d-5) a data bus for mutually connecting the timer and the CPU.

In the DC motor control circuit in the eleventh aspect of the invention, the driving current of the DC motor is controlled by chopping according to the rectangular pulse given by the microcomputer in the first aspect of the invention. This chopping control is done same as in the switching regulator of the first aspect of the invention.

Also in the DC motor control circuit in the eleventh aspect of the invention, since chopping control is digital, the noise characteristic does not deteriorate if this controlling section is incorporated into the microcomputer. Still more, the timing of chopping is based on the rectangular pulse, and the period of the rectangular pulse can be easily controlled by the CPU, so that the DC motor can be driven efficiently.

Preferably, a twelfth aspect of the invention relates to a DC motor control circuit of the eleventh aspect of the invention, wherein the microcomputer further comprises: a D/A convertor controlled by the CPU through the data bus for applying the fixed value.

In the DC motor control circuit in the twelfth aspect of the invention, the fixed value to be compared with the driving current of the DC motor can be varied under control of the CPU.

Therefore, in the DC motor control circuit in the twelfth aspect of the invention, since the driving current of the DC motor can be changed easily, the speed adjustment is easy.

It is therefore, to solve the above problems, an object of the present invention to provide a technology not inducing problems such as deterioration of noise characteristic if incorporated into a digital circuit of microcomputer or the like, by constituting the switching regulator with digital circuits only.

These and other objects, features, aspects and advantages of the present invention will become more apparent from the following description of the present invention when taken in conjunction with the accompanying drawings.

DESCRIPTION OF THE PREFERRED EMBODIMENTS

First Preferred Embodiment

Figure 1:
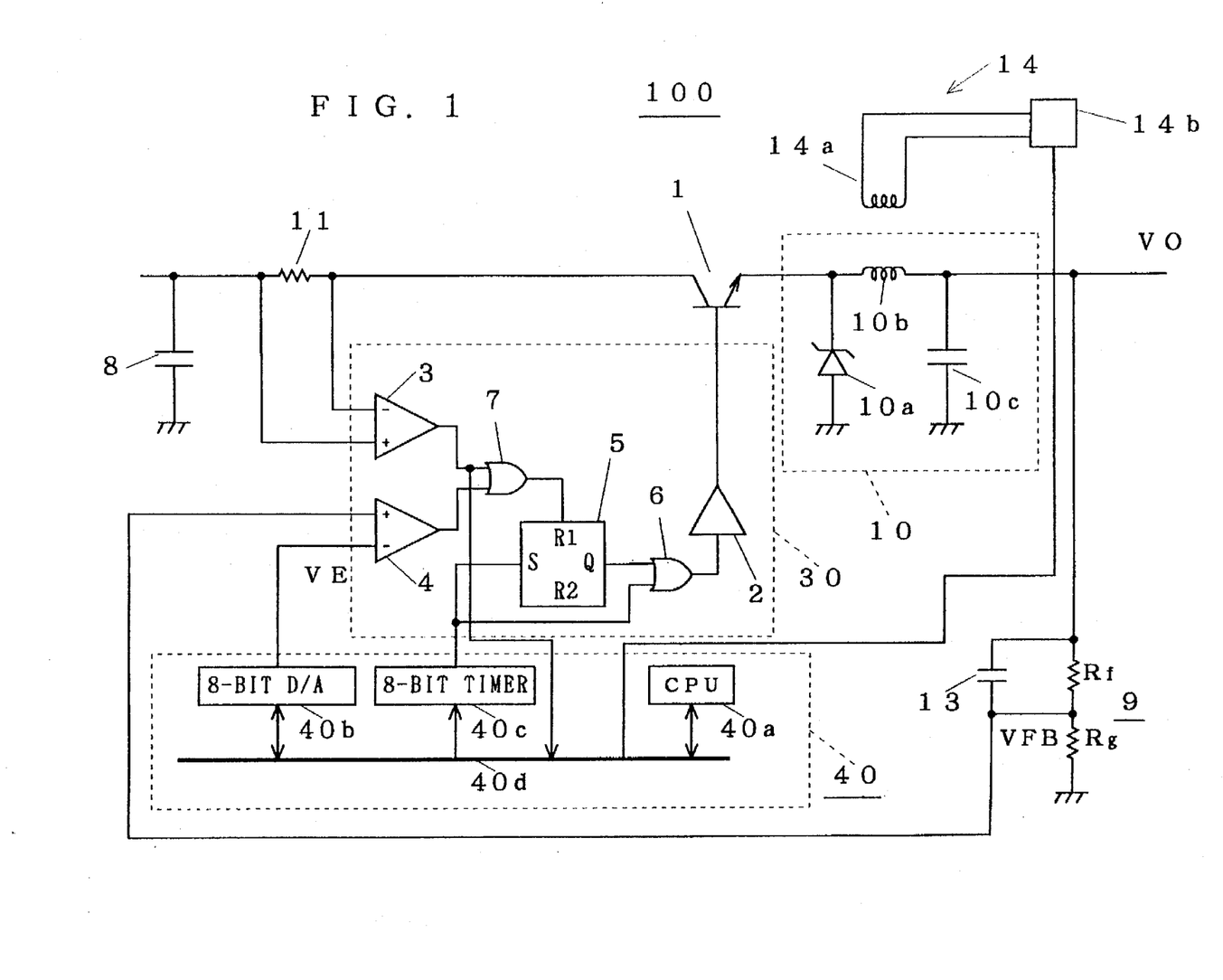
FIG. 1 is a circuit diagram showing a first preferred embodiment of the invention.

FIG. 1 is a circuit diagram showing the construction of a stabilized DC power source 100 in a first preferred embodiment of the invention, and connection relation with a microcomputer 40 connected thereto. In the stabilized DC power source 100, structurally, the switching regulator 20 in the conventional stabilized DC power source 200 is replaced by a switching regulator 30, and a speed-up capacitor 13 connected parallel to a resistor Rf of a voltage setting circuit 9 and a resonance detector 14 are added.

The switching regulator 30, like the switching regulator 20, controls the operation of the switching transistor 1. The speed-up capacitor 13 is effective to raise the feedback voltage VFB steeply.

The switching regulator 30, like the switching regulator 20, comprises a driver 2 for directly controlling the operation of the switching transistor 1, and an OR gate 6 for determining the logic of output of the driver 2. It further comprises comparators 3, 4, and an OR gate 7 for issuing an OR of the outputs of the comparators 3, 4.

The signal for controlling the operation of the switching transistor 1 is issued by the OR gate 6, but the OR gate 6 is small in withstand voltage, and it cannot directly drive the switching transistor 1. Hence, the driver 2 is interspaced between them.

Moreover, same as in the background art, the comparator 3 detects flow of an excessive current in the switching transistor 1, and gives its output to one input end of the OR gate 7, thereby resetting the RS flip-flop 5. In this case, too, the switching transistor 1 is not completely turned off, but is intermittently driven by the rectangular pulse issued by the OR gate 6. This is described in detail below.

The comparator 4 comprises a non-reverse input end for being fed the feedback voltage VFB, a reverse input end for being fed the reference voltage VE given from the microcomputer 40, and an output end connected to the other input end of the OR gate 7.

The output end of the OR gate 7 is connected to a reset terminal R1 of the RS flip-flop 5, but nothing is connected at a set terminal R2 of the RS flip-flop 5. Therefore, only one reset terminal is required in the RS flip-flop used in the invention.

At the set terminal S of the RS flip-flop 5, rectangular pulses are supplied from the microcomputer 40. The rectangular pulses are also supplied to one input end of the OR gate 6.

An output terminal Q of the RS flip-flop 5 is connected to the other input end of the OR gate 6. The OR gate 6 calculates the OR of the rectangular pulse and output of the RS flip-flop 5, and sends out to the driver 2.

The microcomputer 40 comprises a CPU 40a, an 8-bit D/A convertor 40b, and an 8-bit timer 40c. They are mutually connected through an existing data bus 40d of the microcomputer 40. All of them are usually provided in the microcomputer.

The 8-bit D/A convertor 40b issues the reference voltage VE according to the data given to the data bus 40d. The 8-bit timer 40c gives the rectangular pulses to the RS flip-flop 5 and OR gate 6 according to the data given to the data bus 40d. Herein, the period of the rectangular pulse can be varied by the instruction of the CPU 40a.

In the data bus 40d, data is also given from the resonance detector 14. The resonance detector 14 comprises a resonance detecting element 14a and a data convertor 14b, and detects the resonance phenomenon in the smoothing circuit 10.

Such resonance phenomenon is generated when the frequency chopped by the switching transistor 1 or the output frequency of the driver 2 is present near the resonance frequency of the smoothing circuit 10.

The smoothing circuit 10 comprises a constant voltage diode 10a, an inductor 10b, and a capacitor 10c. Therefore, when the resonance frequency determined by the impedances of the inductor 10b and capacitor 10c is close to the chopping frequency, resonance phenomenon occurs, which adversely affects the output voltage VO.

Detection of such resonance phenomenon is realized by inductive coupling of the resonance detecting element 14a and inductor 10b. Whether resonating or not is produced as data by the data convertor 14b, and is applied to the data bus 40d. The CPU 40a receives it, and changes the period of the rectangular pulse produced by the 8-bit timer 40c so as to vary the chopping frequency.

Therefore, in the first preferred embodiment, it is effective to suppress the resonance of the smoothing circuit 10 by varying the chopping frequency of the switching transistor 1. This is very simple as compared with the background art in which the inductor 10b was adjusted manually in order to avoid resonance of the smoothing circuit 10.

A specific operation of the stabilized DC power source 100 is explained below. FIG. 2 through FIG. 5 are waveform diagrams for explaining the operation of the stabilized DC power source 100.

Figure 2:
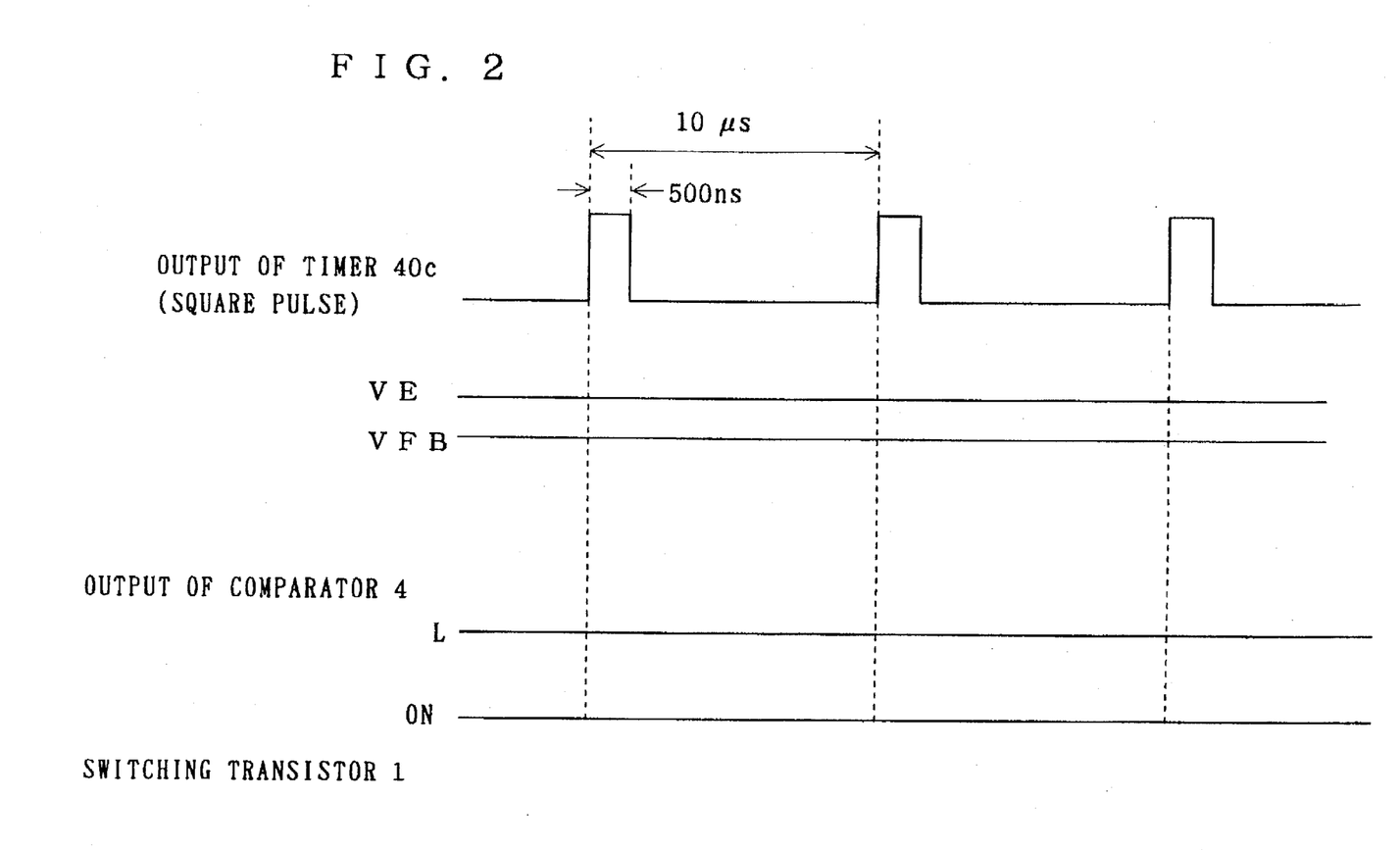
FIGS. 2 to 5 are waveform diagrams explaining the operation of the first preferred embodiment of the invention.

FIG. 2 shows the operation in which the input voltage VI is always lower than the voltage (hereinafter called set voltage) required as output voltage VO. At this time, the feedback voltage VFB is always lower than the reference voltage VE, and the output of the comparator 4 is always "L." Hence, unless the comparator 3 produces "H" due to flow of excessive current in the switching transistor 1, the RS flip-flop 5 is not reset. Therefore, once the RS flip-flop 5 is reset by the rectangular pulse generated by the 8-bit timer 40c, the Q output thereof is always "H," and the switching transistor 1 remains at ON.

Figure 3:
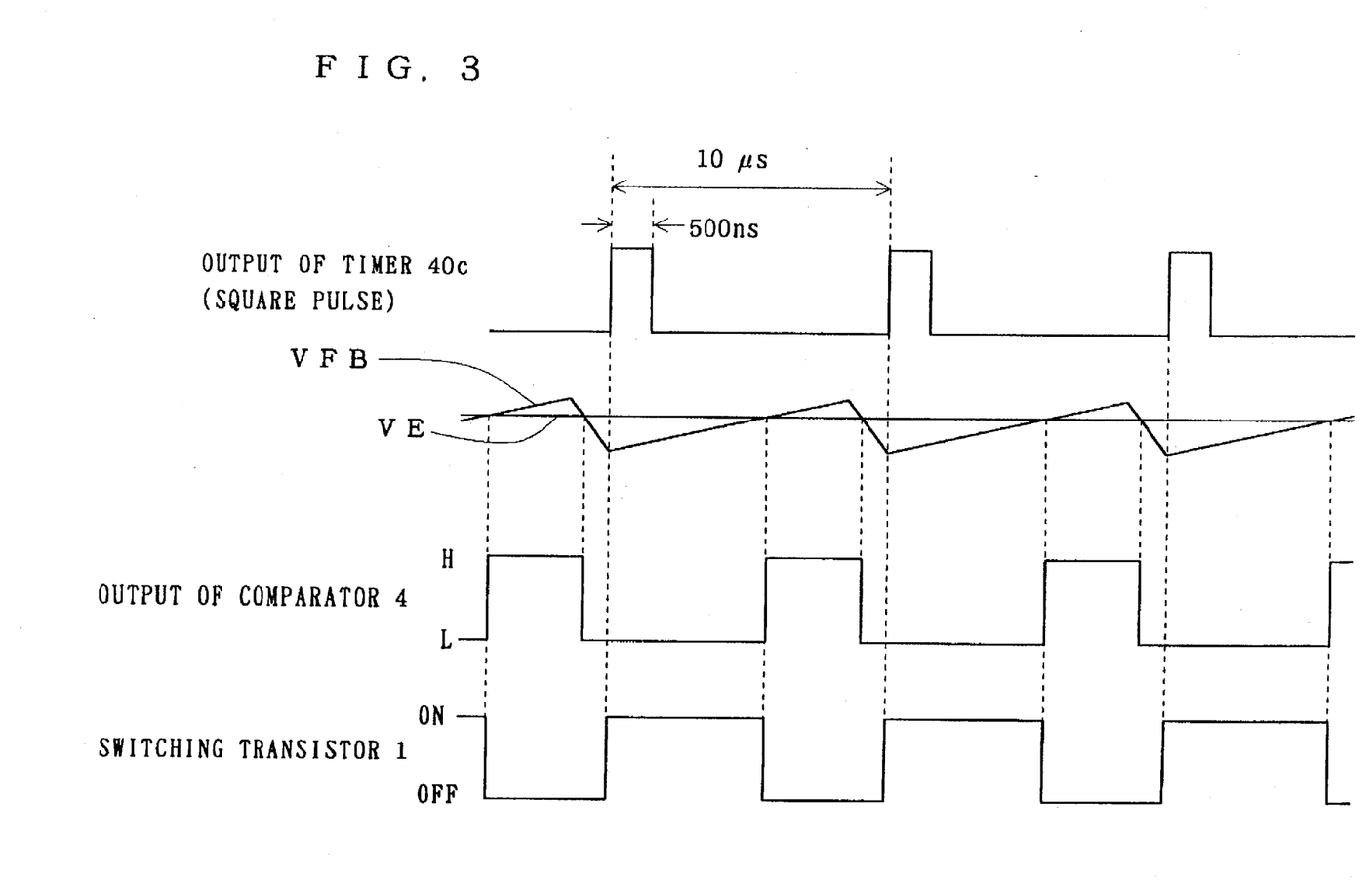

In the operation shown in FIG. 3, the input voltage VI is slightly higher than the set voltage. In this case, when the switching transistor 1 is turned on, the feedback voltage VFB climbs up, and soon surpasses the reference voltage VE. However, when the feedback voltage VFB exceeds the reference voltage VE, the output of the comparator 4 becomes "H," and the RS flip-flop 5 is reset. As a result, the switching transistor 1 is turned off. Afterwards, although delayed by the smoothing circuit 10, the feedback voltage VFB is lowered, becoming lower than the reference voltage VE again. In consequence, when the rectangular pulse rises, the RS flip-flop 5 is set, and the switching transistor 1 is turned on again, so that the feedback voltage VFB goes on rising.

Figure 4:
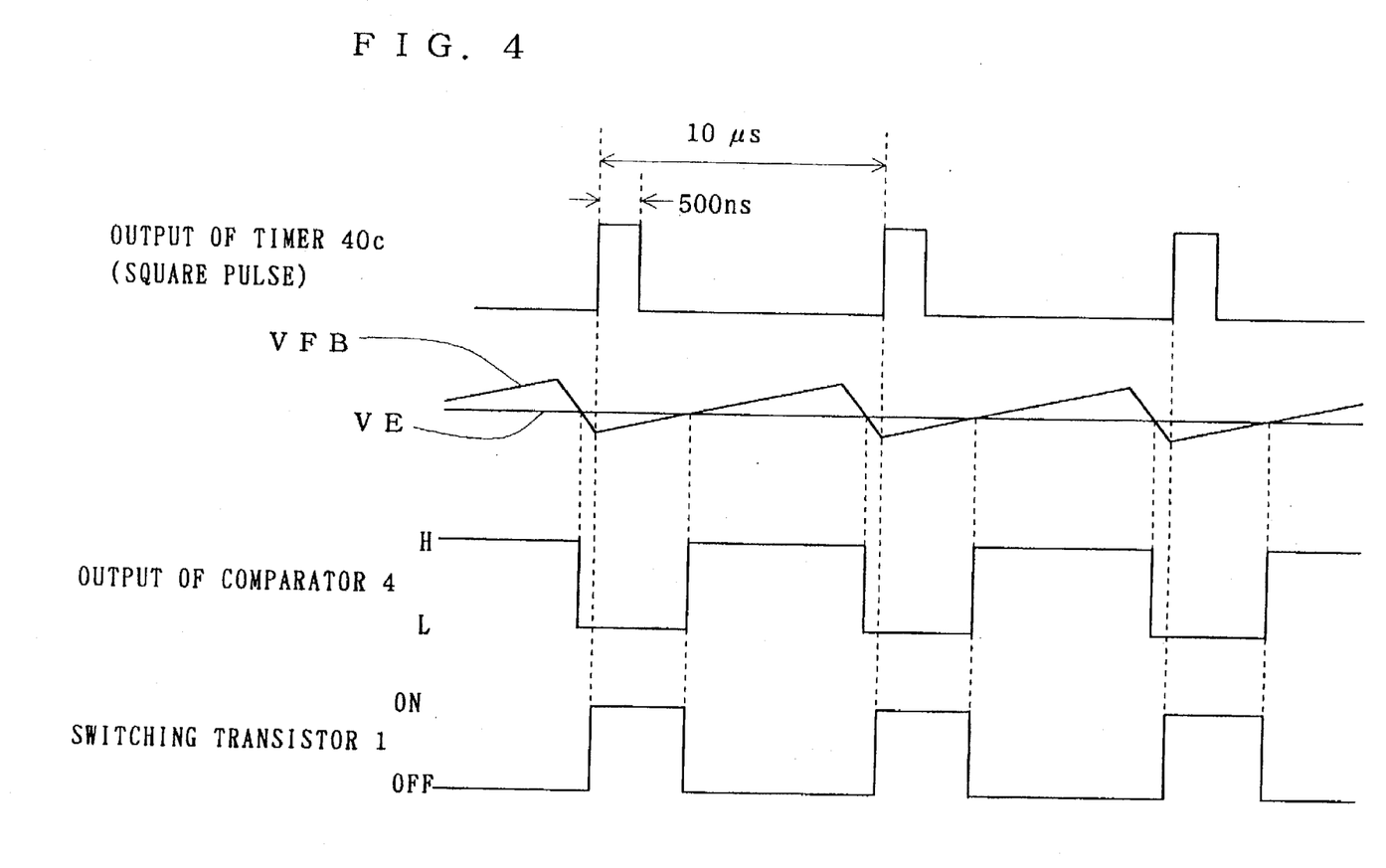

FIG. 4 shows the operation in which the input voltage VI is higher than in the case shown in FIG. 3. In this case, the period of the feedback voltage VFB surpassing the reference voltage VE becomes longer, while the period being lower than the reference voltage VE is shorter. Hence, the ON period of the switching transistor 1 is shorter than in FIG. 3.

Figure 5:
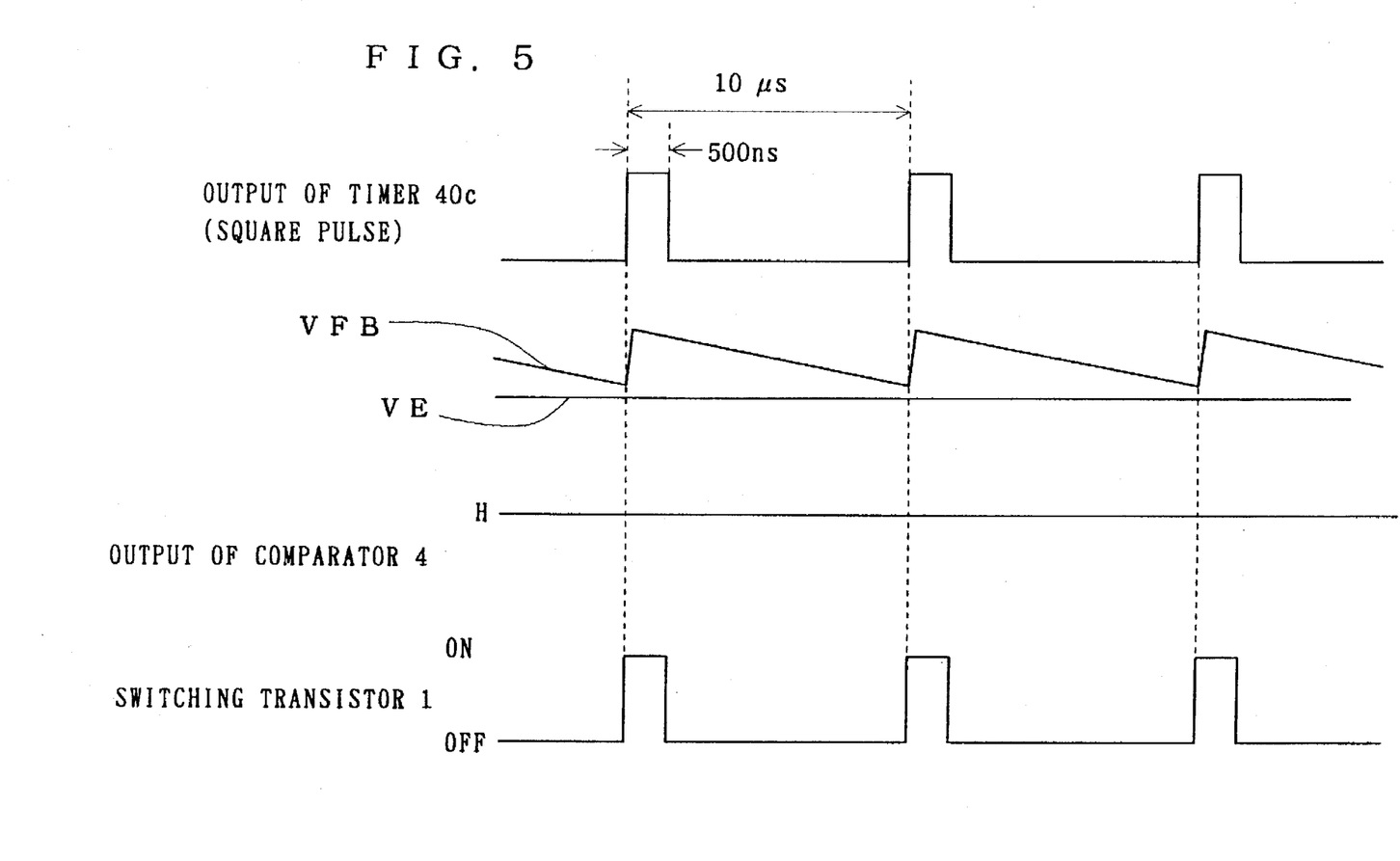

In the operation in FIG. 5, the input voltage VI is always higher than the set voltage. In this case, in principle, the switching transistor 1 may be completely turned off, but the output voltage VO may be lowered depending on the load, and it is preferred to operate the switching transistor 1 intermittently even for a short period. For this purpose, the OR gate 6 is provided, and if the RS flip-flop 5 is not set and hence its Q output is "L," "H" is intermittently supplied to the driver 2. For example, by setting the pulse width of rectangular pulse to 500 ns and the period to 10 μs, the switching transistor 1 can be turned on for 500 ns in every 10 μs.

Thus, a stable DC voltage can be supplied by applying a negative feedback to the output voltage VO. Moreover, since analog circuits are not used, if the switching regulator 30 is incorporated into the microcomputer 40, noise problem does not occur. In addition, since the reference voltage VE is obtained by the 8-bit D/A convertor, the reference voltage VE can be easily changed by the control of the CPU 40a, so that it is easy to cope with if the set voltage is changed. Since the rectangular pulses are supplied from the 8-bit timer 40c, no particular means for generating rectangular pulses is not needed, and only the switching regulator 30 can be incorporated into the microcomputer 40, and hence the degree of integration is not lowered significantly. What is more, in order to avoid resonance of the smoothing circuit 10, the frequency of rectangular pulse can be changed by the control of the CPU 40a.

Change of frequency of rectangular pulse also allows to lower the chopping frequency when an excessive current flows. By controlling in this way, the safety is heightened when the load is short-circuited. Such control is realized by detecting excessive current when the output of the comparator 3 is applied to the CPU 40a through the data bus 40d, and lowering the frequency of the rectangular pulse oscillated by the 8-bit timer 40c by the CPU 40a on the basis thereof.

This frequency of the rectangular pulse in the case of short-circuited load is preferred to be lower from the viewpoint of safety, and preferred to be higher from the viewpoint of restoring the output voltage VO when recovered from abnormal load. Therefore, the frequency should be selected adequately depending on the case. In this invention, the frequency of the rectangular pulse can be changed by the CPU 40a, and it is advantageous that the chopping frequency at the time of short-circuit of the load can be set depending on various cases by programming beforehand.

Second Preferred Embodiment

Figure 6:
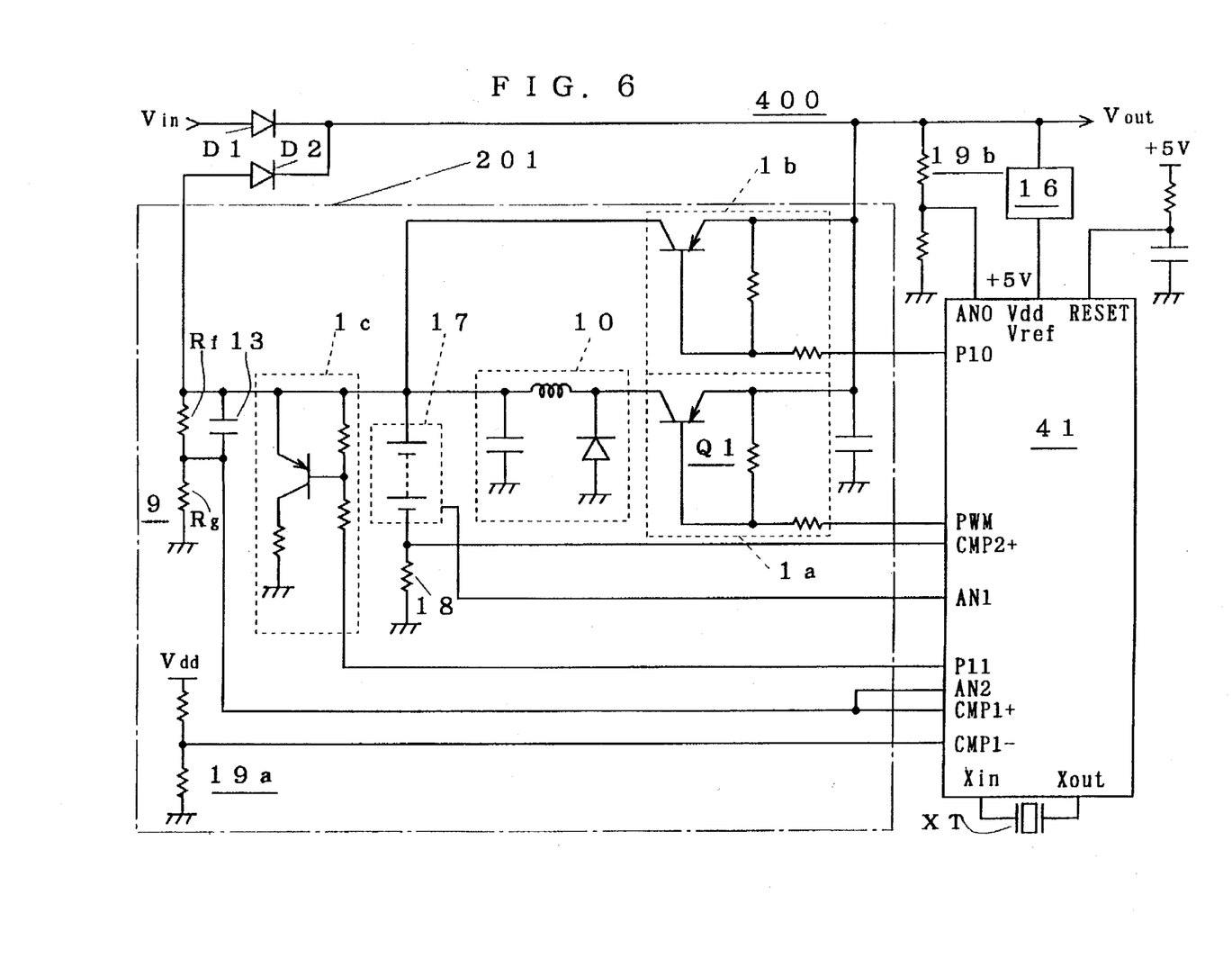
FIG. 6 is a circuit diagram showing a second preferred embodiment of the invention.

FIG. 6 is a circuit diagram showing the construction of a battery charger 201 in a second preferred embodiment of the invention, and the connection relation with a microcomputer 41 which is a battery charger control circuit. The battery charger 201 and microcomputer 41 constitute a DC power source 400, together with diodes D1, D2, monitor circuit 19b, and three-terminal regulator 16.

The DC power source 400 has a function for receiving an input voltage Vin, and stably sending out an output voltage Vout. For this purpose, while the input voltage Vin is maintained at a specified voltage, it is produced as the output voltage Vout through the diode D1, and when the input voltage Vin is lowered, the battery voltage is produced as the output voltage Vout through the diode D2. The output voltage Vout is divided by a monitor circuit 19b, and is given to a terminal AN0 of the microcomputer 41. The microcomputer 41 controls charging and discharging of the battery according to this voltage. The battery is provided as battery 17 in the battery charger 201.

The battery charger 201 comprises, aside from the battery 17, charging circuits 1a, 1b, discharging circuit 1c, smoothing circuit 10, voltage setting circuit 9, speed-up capacitor 13, comparative voltage setting circuit 19a, and current detecting resistor 18.

The battery 17 is discharged through the discharging circuit 1c, and is charged by trickle charge through the charging circuit 1b, and is charged rapidly by the charging circuit 1a through the smoothing circuit 10. Discharge is controlled by the voltage issued to terminal P11 of the microcomputer 41, and trickle charge is controlled by the voltage issued to terminal P10.

The microcomputer 41 incorporates the switching regulator 30 and microcomputer 40 shown in the first preferred embodiment, and terminals CMP1+, CMP1− of the microcomputer 41 are respectively connected to the non-reverse input end and the reverse input end of the comparator 3. Terminal CMP2+ is connected to the non-reverse input terminal of the comparator 4. A terminal PWM is connected to the output end of the driver 2.

The charging circuit 1a possesses transistor Q1 for chopping under control of the driver 2, similar to the switching transistor 1 in FIG. 1. Same as in FIG. 1, the voltage smoothed by the smoothing circuit 10 is applied to the positive electrode of the battery 17. At this time, the charging current flowing in the battery 17 causes voltage drop in the current detecting resistor 18, and this voltage is applied to the non-reverse input end of the comparator 4 through terminal CMP2+. The voltage is then compared with the reference voltage VE applied to the reverse input end of the comparator 4, and the same control as shown in FIG. 2 through FIG. 5 is effected. Hence, the charging current in rapid charging can be stabilized.

At this time, the temperature of .the battery 17 is monitored to the microcomputer 41 through a terminal AN1.

On the other hand, the voltage of the battery 17 is divided by the voltage setting circuit 9 and speed-up capacitor 13, and is monitored by terminal CMP1+. On the other hand, at terminal CMP1−, a specified voltage is applied by the comparative voltage setting circuit 19a. Hence, if the voltage of the battery 17 is excessive, the comparator 3 issues "H" and the RS flip-flop 5 is reset, thereby turning off the transistor Q1.

To confirm discharge, moreover, the voltage of the battery 17 is monitored in the microcomputer 41 through a terminal AN2.

Besides, an oscillator XT is provided between terminals Xin and Xout, and therefore the microcomputer 41 operates according to the specified clock, and the 8-bit timer 40c generates a rectangular pulse according to this block.

Thus, according to the second preferred embodiment, charging current of the battery 17 can be stabilized.

Third Preferred Embodiment

Figure 7:
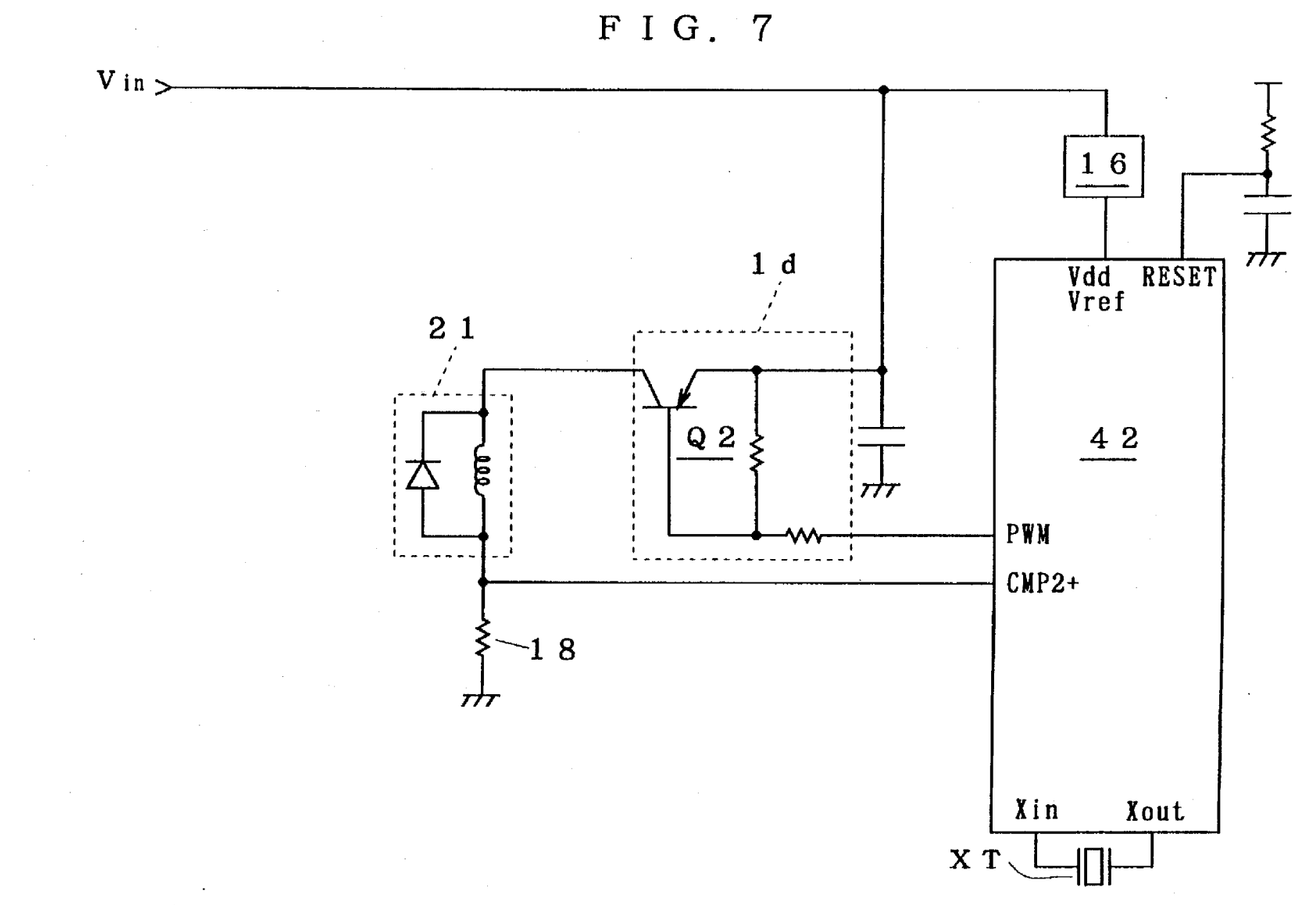
FIG. 7 is a circuit diagram showing a third preferred embodiment of the invention.

FIG. 7 is a circuit diagram showing a DC motor driving circuit 1d in a third preferred embodiment of the invention, and a microcomputer 42 which is a DC motor drive control circuit. The DC motor drive circuit 1d possesses a transistor Q2 for applying a DC voltage to a motor 21, and hence the current flowing in the motor 21 flows into a current detecting resistor 18. The magnitude of the current corresponds to the speed of the motor 21.

The microcomputer 42 is constituted same as the microcomputer 41, and the voltage drop in the current detecting resistance 18 is applied to a non-reverse input end of the comparator 4 through terminal CMP2+. The output of the driver 2 is applied to the Dc motor drive circuit 1d through terminal PWM, and the same control as shown in FIG. 2 to FIG. 5 is conducted. Therefore, the operation of the motor 21 can be controlled stably.

Moreover, the microcomputer 42 is provided with an 8-bit D/A convertor 40b, and by changing the reference voltage VE, the speed control of the motor 21 can be performed easily.

In motor control, when driving the motor, a large current flows until reaching the target value in order to shorten the rise time to reach the target speed, and it is often transferred to uniform speed control with a small current after reaching it. In this case, while a large current flows, switching at high speed is required in order to prevent saturation phenomenon in the inductor. Power consumption is saved by uniform speed control with small current.

In the invention, since the frequency or the like of rectangular pulse generated by the 8-bit timer 40c can be changed easily, the motor 21 can be driven at high frequency in the initial state of driving, and at low frequency thereafter. Therefore, another effect is that the motor may be operated efficiently.

While the invention has been shown and described in detail, the foregoing description is in all aspects illustrative and not restrictive. It is therefore understood that numerous modifications and variations can be devised without departing from the scope of the invention.

We claim:

1. A switching regulator comprising:
   a first logic circuit including:
      a set end provided with a series of rectangular pulses from a pulse source, each pulse transiting between complementary first and second logic values,
      a reset end, and
      an output end issuing said first logic value when said first logic value is applied to said set end and said second logic value when said first logic value is applied to said reset end;
   a second logic circuit including:
      a first input end provided with a fixed value,
      a second input end provided with a variable value to be measured, and
      a second output end connected to said reset end of said first logic circuit and issuing said first logic value when the variable value applied to said second input end is greater than said fixed value applied to said first input end and said second logic value when said variable value applied to said second input end is smaller than said fixed value applied to said first input end; and
   a third logic circuit including a first input end connected to said output end of said first logic circuit, a second input end provided with said series of rectangular pulses, and a third output end issuing an OR logic value relative to logic values applied at said first and second input ends of said third logic circuit.

2. A switching regulator of claim 1, further comprising:
   a driver connected to said output end of said first logic circuit.

3. The switching regulator of claim 1, wherein:
   said switching regulator is connected to a microcomputer; and
   said series of rectangular pulses are supplied from said microcomputer acting as said pulse source.

4. The switching regulator of claim 3, further comprising:
   a fourth logic circuit including:
      a first input end connected to said output end of said second logic circuit,
      a second input end, and a fourth output end connected to said reset end of said first logic circuit, the fourth output end and issuing an OR logic value relative to the logic values applied to said first and second input ends of said fourth logic circuit;

wherein:

said microcomputer also receives the logic value applied to said second input end of said fourth logic circuit and supplies said rectangular pulses with different frequencies corresponding to said microcomputer received logic value.

5. A power source circuit comprising:

an output terminal and an input terminal to which an input voltage is supplied;

a switching element including a first end connected to said input terminal, a second end connected to said output terminal, and a control end, said switching element being controlled to connect said first end and said second end on the basis of a control value applied to said control end by a control element;

a first logic circuit including:
 a set end provided with a series of rectangular pulses from a pulse source, each pulse transiting between complementary first and second logic values,
 a resent end, and
 a first output end connected to said control end of said switching element, said first output end issuing said first logic value when said first logic value is applied to said set end and said second logic value when said first logic value is applied to said reset end;

a second logic circuit including:
 a first input end provided with a fixed value,
 a second input end provided with a variable value indicating a voltage being applied to said output terminal, and
 a second output end connected to said reset end of said first logic circuit, said second output end issuing said first logic value when the variable value applied to said second input end is greater than said fixed value applied to said first input end and said second logic value when said variable value applied to said second input end is smaller than said fixed value applied to said first input end;

a smoothing circuit provided between said second end of said switching element and said output terminal; and a resonance detecting circuit detecting when the smoothing circuit is resonating at a frequency of said series of rectangular pulses.

6. The power source circuit of claim 5, further comprising:

said control element being a driver provided between said control end of said switching element and said output end of said first logic circuit, said driver controlling the operation of said switching element through said control end of said switching element on the basis of the logic value issued by said output end of said first logic circuit.

7. The power source circuit of claim 5, further comprising:

a variable value generating element providing said variable value by sampling a portion of the voltage applied to said output terminal.

8. The power source circuit of claim 7, wherein said variable value generating element includes:

first and second resistors connected in series, and a capacitor connected parallel to said first resistor; and wherein said output voltage is applied to the series connected said first and second resistors and said variable value is obtained from between said first and second resistors.

9. The power source circuit of claim 5, wherein said smoothing circuit includes an inductor; and said resonance detecting circuit includes a resonance detecting element coupled by inductance to said inductor.

10. The power source circuit of claim 5, further comprising:

a microcomputer including:
 a timer acting as said source issuing said series of rectangular pulses,
 a CPU controlling the operation of said timer, and
 a data bus mutually connecting said timer and said CPU;

wherein said resonance detecting circuit transmits a detected state of resonance of said smoothing circuit at a frequency of said series of rectangular pulses to said CPU through said data bus.

11. The power source circuit of claim 10, wherein said microcomputer further includes:

a D/A convertor connected to said data bus for issuing said fixed value, said D/A convertor being controlled by said CPU.

12. The power source circuit of claim 10, further comprising:

a third logic circuit including a first input end connected to said first output end of said first logic circuit, a second input end provided with said series of rectangular pulses, and a third output end issuing an OR logic value relative to the logic values applied to said first and second input ends of said third logic circuit.

13. The power source circuit of claim 12, further comprising:

a fourth logic circuit issuing said first logic value when a current flowing in said switching element exceeds a specified value and said second logic value when the current flowing in said switching element is less than the specified value as a fourth output; and a fifth logic circuit including:
 a first input end connected to said second output end of said second logic circuit,
 a second input end for receiving the fourth output of said fourth logic circuit, and
 a fifth output end connected to said reset end of said first logic circuit, said fifth output end issuing an OR logic value relative to the logic values applied to said first and second input ends of said fifth logic circuit;

wherein:

the fourth output of said fourth logic circuit is applied to said CPU through said data bus; and said CPU controls said timer to generate said series of rectangular pulses with different frequencies depending on whether said fourth output of said fourth logic circuit is at said first or said second logic value.

14. The power source circuit of claim 13, wherein said fourth logic circuit includes:

a current detecting resistor including a first end connected to said input terminal and a second end connected to said first end of said switching element, and a comparator including first and second ends connected respectively to said first and second ends of said current detecting resistor, and a comparator output end issuing said first logic value only when a specified potential difference is present between said first and second ends of said current detecting resistor.

15. A battery charger control circuit comprising:

an input terminal to which an input voltage is supplied and an output terminal for supplying a charging current to a battery;

a switching element including a first end connected to said input terminal, a second end connected to said output terminal, and a control end, said switching element being controlled to connect said first end and said second end on the basis of a control value applied to said control end;

current-voltage converting means for converting said charging current into a voltage;

measured value generating means for generating a measured value on the basis of a voltage applied to said battery;

reference signal generating means for providing a reference value to be compared with said measured value; and a microcomputer including:
  a timer supplying a series of rectangular pulses, each pulse transiting between complementary first and second logic values,
  a first logic circuit including:
    a set end provided with said series of rectangular pulses,
    a reset end, and
    a first output end connected to said control end of said switching element, said first output end issuing said first logic value when said first logic value is applied to said set end and said second logic value when said first logic value is applied to said reset end,
  a second logic circuit including:
    a first input end provided with a fixed value,
    a second input end provided with an output of said current-voltage converting means, and
    a second output end issuing said first logic value when the value applied to said second input end of said second logic circuit is greater than the fixed value applied to said second input end of said second logic circuit and said second logic value when said value applied to said second input and of said second logic circuit is smaller than said fixed value applied to said first input end of said second logic circuit,
  a third logic circuit including:
    a first input end provided with said reference value,
    a second input end provided with said measured value, and
    a third output end issuing said first logic value only when a specified potential difference is detected between said first and second input ends of said third logic circuit,
  a fourth logic circuit including:
    a first input end connected to said second output end of said second logic circuit,
    a second input end connected to said third output end of said third logic circuit, and
    a fourth output end connected to said reset end of said first logic circuit, said fourth output end issuing an OR logic value relative to the logic values applied to said first and second input ends of said fourth logic circuit,
  a CPU for controlling an operation of said timer, and
  a data bus for mutually connecting said timer and said CPU.

16. The battery charger control circuit of claim 15, further comprising:

an oscillator for defining a frequency of an operation clock of said microcomputer, wherein said rectangular pulses are generated on the basis of said operation clock.

17. A DC motor control circuit comprising:

an input terminal to which an input voltage is supplied and an output terminal for supplying a driving current to a DC motor;

a switching element possessing a first end connected to said input terminal, a second end connected to said output terminal, and a control end, said switching element being controlled to connect said first end and said second end on the basis of a control value applied to said control end by a control element;

current-voltage converting means for converting said driving current into a voltage;

a microcomputer including:
  a timer supplying a series of rectangular pulses, each pulse transiting between complementary first and second logic values,
  a first logic circuit including:
    a set end provided with said series of rectangular pulses,
    a reset end, and
    a first output end connected to said control end of said switching element, said first output end issuing said first logic value when said first logic value is applied to said set end and said second logic value when said first logic value is applied to said reset end,
  a second logic circuit including:
    a first input end provided with a fixed value,
    a second input end provided with an output of said current-voltage converting means, and
    a second output end connected to said reset end of said first logic circuit, said second output end issuing said first logic value when the value of the current-voltage converting means output applied to said second input end of said second logic circuit is greater than the fixed value applied to said first input end of said second logic circuit, and said second logic value when said value of the current-voltage converting means output applied to said second input end of said second logic circuit is smaller than said fixed value applied to said first input end of said second logic circuit,
  a CPU for controlling the operation of said timer, and
  a data bus for mutually connecting said timer and said CPU.

18. The DC motor control circuit of claim 17, wherein said microcomputer further comprises:

a D/A convertor controlled by said CPU through said data bus for applying said fixed value.

* * * * *